UNITED STATES PATENT OFFICE.

ELLIS C. SOPER, OF CHATTANOOGA, TENNESSEE.

TREATMENT OF PHOSPHATES.

1,396,149.  Specification of Letters Patent.  Patented Nov. 8, 1921.

No Drawing.  Application filed July 6, 1918. Serial No. 243,678.

*To all whom it may concern:*

Be it known that I, ELLIS C. SOPER, a citizen of the United States, residing at Chattanooga, in the county of Hamilton and State of Tennessee, have invented certain new and useful Improvements in the Treatment of Phosphates, of which the following is a specification.

My invention relates to new and useful improvements in the treatment of phosphates, and particularly relates to the conversion of insoluble phosphates, for example, calcium phosphate, phosphate of iron, and phosphate of aluminum, or combinations thereof, into citrate soluble form, rendering them suitable for use as fertilizers.

The invention is equally applicable to the treatment of phosphates of calcium, such as are known as Tennessee phosphates and Florida phosphates; phosphates of iron and aluminum which occur principally in the West Indies, and phosphates of aluminum known as apatite. The invention is also applicable to the treatment of so-called "soft phosphates" which are found in large quantities in Florida, and low grade phosphates, which do not contain sufficient phosphoric acid for commercial treatment by processes hitherto known.

The invention consists in the improvements to be more fully described hereinafter, and the novelty of which will be particularly pointed out and distinctly claimed.

It has been proposed, previous to my invention, to treat insoluble phosphates, for example, phosphate of calcium, with the addition of alkali metal salts and other alkalis and also hydrocarbons and carbonaceous materials, such for example, as coal, coke, pitch, asphalt, etc., acting as reagents with heat at a high temperature to convert the same into citrate soluble form, but such previous processes have proven commercially impractical, as far as I am aware, because they are not adapted for being carried out continuously, and to a commercial extent, and furthermore because it was difficult, if not impossible, when working under commercial conditions to impart to the material a vesicular condition, which appears to be essential to the proper conversion of the mass of material from insoluble to citrate soluble form.

I have discovered in order to provide for an efficient process which will successfully produce a commercial yield of citrate soluble phosphoric acid from the raw phosphate material, it is necessary to produce a complete and intimate mixture of the reagent with the raw phosphate material, and that this is best done by finely grinding the materials to such an extent and with the addition of water in such amount that the mixture is fluid, thereby causing the reagent to be thoroughly disseminated throughout the mass and be in intimate contact with the phosphatic material, and then to treat this mixture at the proper temperature, preferably in a rotary kiln. Treatment of this fluid material in a rotary kiln is difficult, because the wet or fluid mixture adheres to the inner lining of the kiln at the inlet portion thereof, resulting in building up, known as "ringing" in rotary kiln practice, of the mixture on the inner surface of the kiln to such an extent that said material will not pass rapidly through the kiln, and be properly subjected to the heat thereof, or will drop from the surface of the kiln in such large masses and in such a solid or unporous condition, that the heat cannot find access evenly and efficiently throughout the entire mass. This is due to the fluid condition of the mixture, which appears necessary to the proper mixture of the ingredients, causing the material to adhere to the kiln.

In order to overcome this difficulty, I have discovered that the mixture with the fluid material of a stiffener or drier which will reduce the initial fluid condition to a substantially plastic state, and the formation of this plastic material into suitable shapes, such as briquets of convenient form, permits the treatment of the material in a kiln without any tendency toward adherence of the mixture to the kiln, and insures the proper passage of the same through the kiln and the proper dissemination of the heat throughout the phosphatic material.

Under certain conditions where the fuel cost is high, it may be expedient to grind the materials in a tube mill without the addition of water to make a fluid mixture, and then briqueting the phosphatic material preferably under pressure.

My invention generally consists in forming briquets of a compound containing an intimate mixture of finely ground phosphatic material bound with a combustible, and subjecting said briquets to a high temperature sufficient to render the phosphoric acid citrate soluble, for example, a calcining temperature of 1800° to 2650° F. serving to burn or volatilize the combustible, or volatile material out of the briquets, thereby leaving the phosphate content of each briquet in a vesicular condition, so that the reagent and heat may act effectively to bring about the proper conversion of the phosphate from insoluble to citrate soluble form. This combustible or volatile material may or may not have any chemical effect in the process, that is, it may act or may not act as a reagent, for example, it may consist of finely ground coal or coke, sawdust, pitch, gluten, or other carbonaceous material, which will burn quickly when the mass or mixture is initially subjected to heat, for example, in a rotary kiln of the type illustrated in my application, Serial No. 211,477. Other advantages accruing from the use of this combustible or volatile material will appear in the following description.

The phosphatic material may be, for example, phosphate of calcium, such as Florida pebble phosphates, ground either together or separately with a proper reagent, for example, an alkali metal salt, such as sodium sulfate, sodium bi-sulfate, or sodium carbonate, in varying proportions, depending upon the quality of the phosphate material used as regards its phosphoric acid content. For example, where the phosphatic material is a phosphate of calcium, such as is known as "Florida pebble phosphate" which may contain approximately 31% phosphoric acid in an insoluble form, the rock is pulverized with 20% to 40% of sodium bi-sulfate or niter cake to a fineness of about 98% or more through a sieve of 100 meshes to the inch. If salt cake, sodium sulfate, is used, a relatively smaller percentage is required, for example, about 15 to 30%. The best results are secured when the silica in the phosphate being used is less than about 8%. If it exceeds this amount, then it is desirable to add calcium carbonate, which is a salt of an alkaline earth metal, in liberal amount to combine with the silica as otherwise a tendency to fuse is present. Also, the clinker is much softer and easier to grind when calcium carbonate is added. Good results can be obtained with the addition of this material alone, without the addition of alkaline material or carbonaceous material, the calcium carbonate acting as a binder.

In carrying my invention into effect, I may proceed as follows:—

A suitable phosphatic material, as for example, one or more of those to which reference has just been made, is ground very fine, the best results being secured when the fineness exceeds 95 to 97% through 100 mesh. Any of the reagents mentioned above, including also the salts of the alkali metals and the alkaline metal earths, may be used and these are ground to the same fineness as the phosphatic material, preferably the grinding being done in a tube mill wherein the phosphatic and salts of the alkaline metals are ground together, so as to secure an intimate mixture thereof.

In accordance with an important feature of my invention I provide for binding this mixture, and preferably the binding material will be of a carbonaceous character, such as pitch, gluten, or any combustible, may be used for the binder, and the latter may be alkaline in character, especially when compounded with phosphates and a carbonaceous reagent, or with phosphates without a carbonaceous reagent. The amount of binder may be from 10 to 30%, but these limits may be varied, as the binder itself may constitute one of the reagents, and similarly there may be variation in the percentage of reagent employed, which preferably will be from 15% to 30% of the weight of phosphatic material used.

Among the advantageous combinations of material for the briquets are (a) phosphates with carbonaceous materials and salts of the alkali metals and the alkaline earth metals as reagents and a binder; (b) phosphates with salts of the alkali metals and the alkaline earth metals as reagents and a carbonaceous binder; (c) phosphates with a carbonaceous binder; (d) phosphates with a carbonaceous reagent and carbonaceous binder; (e) phosphates with carbonaceous reagent and a salt of the alkali metals, or alkaline earth metals as a binder and (f) phosphates with an alkaline binder consisting of a salt of one of the alkali metals, or alkaline earth metals.

In each of the above mixtures in which a combustible material is used, the combustible performs at least two important functions:

First, better fuel economy is effected by the intimate contact of the combustible with the material to be treated.

Second, the presence of the combustible increases the rapidity of decomposition or volatilization of the alkaline earth metal or alkali metal reagent.

Third, it is possible that it also assists in other ways to effect the change from insoluble to citrate soluble, as fairly good results can be obtained through the use with the phosphatic material of the combustible without the presence of any alkaline earth metal or alkali metal reagent.

When the combustible is used as a reagent greater percentages should be employed, but when used in conjunction with an alkaline earth metal or alkali metal reagent, 10 to 30% may be used to advantage, although these limits may be varied.

The phosphatic material having been provided with a suitable combustible binder, as above indicated, with or without a separate alkaline earth metal or alkali metal reagent, the compound is preferably pressed into any desirable and convenient shape, such as cubes, cylinders, etc., and this may be accomplished by any suitable means, such as a briquet machine of any well-known or suitable character, the size of the briquets being governed by the exigencies of subsequent treatment, but a size of one inch serving admirably when the briquets are to be treated in a rotary kiln, as I prefer.

A convenient form of such rotary kiln is that shown in my application, Serial No. 211,477, containing a neutral or basic lining, and set at an inclination of preferably one and one-quarter inches per foot, and the net diameter of the kiln will preferably be about one-eighteenth of the length, the latter varying from 10 feet to 100 or more feet as may be found desirable.

The briquets, which term I use without special technical significance to designate any desired shape, are preferably introduced into the upper end of such a rotary kiln and heat is introduced at the other and lower end of the kiln as usual in such processes to produce the stated temperature, the furnacing condition being preferably of an oxidizing character at the front end of the furnace, for which the best results are secured with a white, short, flame. However, good material may be produced with a "lazy" longer flame, although the resulting clinker will be much harder to grind. The material issues from the kiln in the form of porous clinkers, and when ground to a fineness of 90% through 100 mesh, the phosphoric acid content is substantially all citrate soluble. These clinkers are not necessarily so soft as those produced by other processes, and the availability decreases rapidly as the fineness decreases. The clinker is much softer and easier to grind if calcium carbonate be added, as noted earlier in this specification.

In general it should be noted that in preparation of the materials, whenever a carbonaceous material is used, it should preferably be finely ground, if a solid, and thoroughly mixed with the material to be treated. In using the term alkaline metal in the claims, I use the same generically to cover suitable reagents both of the alkali metals and of the alkaline earth metals.

What I claim and desire to secure by Letters Patent of the United States, is:—

1. The process of treating phosphatic material to render the contained phosphoric acid citrate soluble, said process consisting in forming briquets of a compound containing an intimate mixture of finely ground phosphatic material bound with a combustible binder, and subjecting said briquets to a high temperature sufficient to burn the combustible binder and render the phosphoric acid citrate soluble.

2. The process of treating phosphatic material to render the contained phosphoric acid citrate soluble, said process consisting in forming briquets of a compound containing an intimate mixture of finely ground phosphatic material bound with a combustible carbonaceous material, and subjecting said briquets to a high temperature sufficient to burn said combustible carbonaceous material and render the phosphoric acid citrate soluble.

3. The process of treating phosphatic material to render the contained phosphoric acid citrate soluble, said process consisting in forming briquets of a compound containing an intimate mixture of finely ground phosphatic material bound with pitch, and subjecting said briquets to a high temperature sufficient to burn the pitch and render the phosphoric acid citrate soluble.

4. The process of treating phosphatic material to render the contained phosphoric acid citrate soluble, said process consisting in forming briquets of a compound containing an intimate mixture of finely ground phosphatic material bound with a combustible binder, and subjecting said briquets to a high temperature sufficient to burn the combustible binder and render the phosphoric acid citrate soluble in a kiln having a basic or neutral lining.

5. The process of treating phosphatic material to render the contained phosphoric acid citrate soluble, said process consisting in forming briquets of a compound containing an intimate mixture of finely ground phosphatic material bound with a combustible binder, and heating said briquets, in a kiln having a basic or neutral lining in which an oxidizing condition is maintained, to burn said combustible binder and render the phosphoric acid citrate soluble.

6. The process of treating phosphatic material to render the contained phosphoric acid citrate soluble, said process consisting in forming briquets of a compound containing an intimate mixture of finely ground phosphatic material bound with a combustible binder, and subjecting said briquets to a high temperature sufficient to burn said combustible binder and render the phosphoric acid citrate soluble in a rotary kiln.

7. The process of treating phosphatic material to render the contained phosphoric acid citrate soluble, said process consisting in forming briquets comprising said phosphatic material and a binder, heating said briquets to a temperature sufficient to render the phosphoric acid citrate soluble in a rotary kiln having a neutral or basic lining, and reducing said finished product to a fineness of at least 90% through 100 mesh.

8. The process of treating phosphatic material to render the contained phosphoric acid citrate soluble, said process consisting in forming an intimate mixture of finely ground phosphatic material with a reagent comprising a salt of an alkaline metal, and a binder, forming the compound into briquets, and subjecting said briquets to a high temperature sufficient to render the phosphoric acid citrate soluble.

9. The process of treating phosphatic material to render the contained phosphoric acid citrate soluble, said process consisting in forming an intimate mixture of finely ground phosphatic material with a reagent comprising a salt of an alkaline metal with carbonaceous matter, and a binder, forming the compound into briquets, and subjecting said briquets to a high temperature sufficient to render the phosphoric acid citrate soluble.

10. The process of treating phosphatic material to render the contained phosphoric acid citrate soluble, said process consisting in forming an intimate mixture of finely ground phosphatic material with a reagent comprising a salt of an alkaline metal and a carbonaceous binder, forming the compound into briquets, and subjecting said briquets to a high temperature sufficient to render the phosphoric acid citrate soluble.

11. The process of treating phosphatic material to render the contained phosphoric acid citrate soluble, said process consisting in forming an intimate mixture of finely ground phosphatic material with a carbonaceous binder, forming the compound into briquets, and subjecting said briquets to a high temperature sufficient to render the phosphoric acid citrate soluble.

12. The process of treating phosphatic material to render the contained phosphoric acid citrate soluble, said process consisting in forming an intimate mixture of finely ground phosphatic material with a carbonaceous reagent and carbonaceous binder, forming the compound into briquets, and subjecting said briquets to a high temperature sufficient to render the phosphoric acid citrate soluble.

13. The process of treating phosphatic material to render the contained phosphoric acid citrate soluble, said process consisting in forming an intimate mixture of finely ground phosphatic material with a carbonaceous reagent and a binder comprising a salt of an alkaline metal, forming the compound into briquets, and subjecting said briquets to a high temperature sufficient to render the phosphoric acid citrate soluble.

14. The process of treating phosphatic material to render the contained phosphoric acid citrate soluble, said process consisting in forming an intimate mixture of finely ground phosphatic material with a binder comprising a salt of an alkaline metal, forming the compound into briquets, and subjecting said briquets to a high temperature sufficient to render the phosphoric acid citrate soluble.

15. The process of treating phosphatic material to render the contained phosphoric acid citrate soluble, said process consisting in forming an intimate mixture of finely ground phosphatic material with a calcium carbonate binder, forming the compound into briquets, and subjecting said briquets to a high temperature sufficient to render the phosphoric acid citrate soluble.

16. The process of treating phosphatic material to render the contained phosphoric acid citrate soluble, said process consisting in forming an intimate mixture of finely ground phosphatic material containing silica in excess of eight per cent. with a reagent comprising a salt of an alkali metal and a carbonaceous binder comprising calcium carbonate to combine with said silica, forming the compound into briquets, and subjecting said briquets to a high temperature sufficient to render the phosphoric acid citrate soluble.

17. The process of treating phosphatic material to render the contained phosphoric acid citrate soluble, said process consisting in forming an intimate mixture of finely ground phosphatic material with a reagent comprising a salt of an alkaline metal and approximating fifteen per cent. to thirty per cent. of the weight of phosphate used, adding a binder approximating ten to thirty per cent. of said weight, forming the compound into briquets, and subjecting said briquets to a high temperature sufficient to render the phosphoric acid citrate soluble.

18. The process of treating phosphatic material to render the contained phosphoric acid citrate soluble, said process consisting in forming an intimate mixture of finely ground phosphatic material with a reagent comprising a salt of an alkaline metal and a combustible binder in excess of thirty per cent. of the weight of said phosphatic material used, forming said compound into briquets, and subjecting the briquets to a high temperature sufficient to render the phosphoric acid citrate soluble.

19. The process of treating phosphatic material to render the contained phosphoric acid citrate soluble, said process consisting in forming an intimate mixture of finely ground phosphatic material with a reagent acting in conjunction with heat to render the phosphoric acid citrate soluble, forming the mixture into briquets, and subjecting said briquets to a high temperature sufficient to render the phosphoric acid citrate soluble.

20. The process of treating phosphatic material to render the contained phosphoric acid citrate soluble, said process consisting in forming an intimate mixture of finely ground phosphatic material, a reagent acting in conjunction with heat to render the phosphoric acid citrate soluble, and a binder, forming the mixture into briquets, and subjecting said briquets to a high temperature sufficient to render the phosphoric acid citrate soluble.

21. The process of treating phosphatic material to render the contained phosphoric acid citrate soluble, said process consisting in forming an intimate mixture of finely ground phosphatic material with a reagent acting in conjunction with heat to render phosphoric acid citrate soluble, and a combustible binder, forming the mixture into briquets, and subjecting said briquets to a a high temperature sufficient to render the phosphoric acid citrate soluble.

22. The process of treating phosphatic material to render the contained phosphoric acid citrate soluble, consisting in forming briquets comprising said phosphatic material, a reagent and a binder, heating said briquets in a rotary kiln having a neutral or basic lining to a temperature sufficient to render the phosphoric acid citrate soluble, and reducing said finished product to a fineness of at least 90% through 100 mesh.

23. The process of treating phosphatic material to render the contained phosphoric acid citrate soluble, consisting in grinding the phosphatic material and an alkali metal salt in an amount equal to 15 to 40% of the phosphatic material, adding a binder in an amount equal to 10 to 30% of the phosphatic material, forming the mixture into briquets, and calcining the briquets at a high temperature.

In testimony whereof I have hereunto signed my name in the presence of two subscribing witnesses.

ELLIS C. SOPER.

Witnesses:
G. A. CARRINGTON,
R. W. STORRS, Jr.